US012631761B2

(12) United States Patent
Mohammed

(10) Patent No.: US 12,631,761 B2
(45) Date of Patent: May 19, 2026

(54) ENHANCED POSITIONING AFTER ERROR RECOVERY

(71) Applicant: QUALCOMM Incorporated, San Diego, CA (US)

(72) Inventor: Qutubuddin Mohammed, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/432,289

(22) Filed: Feb. 5, 2024

(65) Prior Publication Data

US 2025/0251518 A1 Aug. 7, 2025

(51) Int. Cl.
*G01S 19/25* (2010.01)
*G01S 19/39* (2010.01)
*H04W 64/00* (2009.01)

(52) U.S. Cl.
CPC .......... *G01S 19/252* (2013.01); *G01S 19/396* (2019.08); *H04W 64/00* (2013.01)

(58) Field of Classification Search
None
See application file for complete search history.

(56) References Cited

U.S. PATENT DOCUMENTS

| | | | | |
|---|---|---|---|---|
| 9,423,505 B2 * | 8/2016 | Riley | ...................... | G01S 19/25 |
| 11,445,465 B2 * | 9/2022 | Manolakos | ........... | H04W 64/00 |
| 12,389,363 B2 * | 8/2025 | Sundararajan | ........ | H04W 4/029 |
| 2002/0132626 A1 * | 9/2002 | Tsunehara | ............... | G01S 19/46 |
| | | | | 455/457 |
| 2010/0298008 A1 * | 11/2010 | Burroughs | ............ | H04W 64/00 |
| | | | | 455/456.1 |
| 2012/0178470 A1 * | 7/2012 | Riley | ...................... | G01S 19/46 |
| | | | | 455/456.1 |
| 2017/0131410 A1 * | 5/2017 | Riley | ...................... | G01S 19/25 |

* cited by examiner

*Primary Examiner* — Bernarr E Gregory
(74) *Attorney, Agent, or Firm* — QUALCOMM Incorporated

(57) ABSTRACT

A user equipment includes processor(s) configured to: obtain first acquisition assistance (AA) data by one or more receivers from a network; determine whether external coarse position injection (CPI) data, received by the one or more receivers from the network, exceed a reliability threshold; and in response to the one or more external CPI data exceeding the reliability threshold: calculate a horizontal error position estimate (HEPE) based on measurement(s) obtained according to second AA data, where the second AA data includes a subset of satellite vehicles from the first AA data; and determine a position of the user equipment based on the external CPI data and the HEPE.

20 Claims, 4 Drawing Sheets

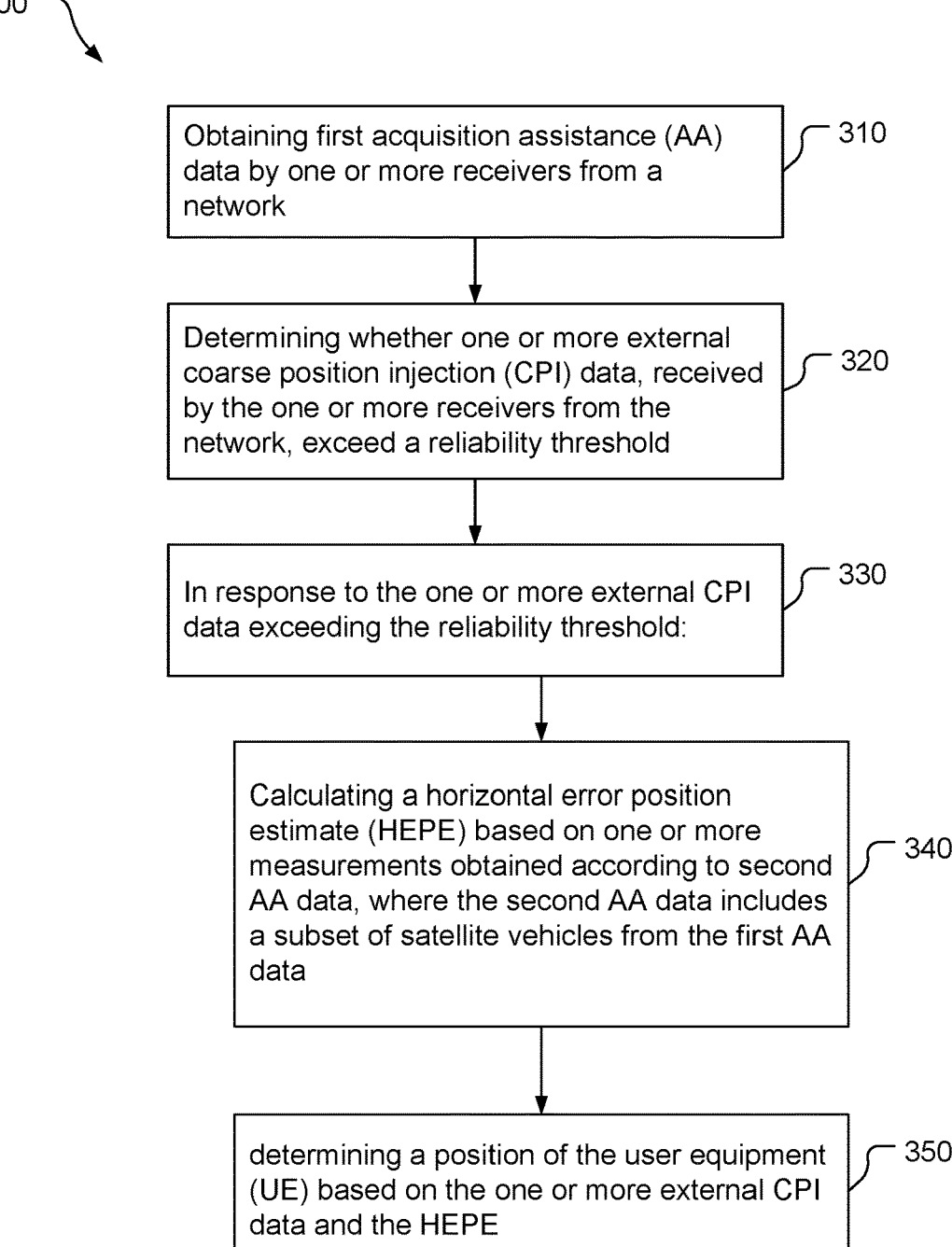

300

Obtaining first acquisition assistance (AA) data by one or more receivers from a network — 310

Determining whether one or more external coarse position injection (CPI) data, received by the one or more receivers from the network, exceed a reliability threshold — 320

In response to the one or more external CPI data exceeding the reliability threshold: — 330

Calculating a horizontal error position estimate (HEPE) based on one or more measurements obtained according to second AA data, where the second AA data includes a subset of satellite vehicles from the first AA data — 340 determining a position of the user equipment (UE) based on the one or more external CPI data and the HEPE — 350

FIG. 3

ENHANCED POSITIONING AFTER ERROR RECOVERY

BACKGROUND

Global navigation satellite systems (GNSS) are used to determine a global position and/or location of any number of mobile stations. A GNSS may include a constellation of orbiting satellites that each transmit a time-synchronized signal. A mobile station may receive the time-synchronized signal from a number of GNSS satellites. By determining a time of transmission associated with each received time-synchronized signal and having knowledge of the location of each of the satellites that transmitted each received time-synchronized signal, the mobile station may determine its global location. The typical resolution of GNSS systems is typically in the range of two to three meters, however, this resolution may be reduced when the time-synchronized signals are obstructed by natural and man-made barriers, such as mountains, canyons, urban canyons, and tunnels.

SUMMARY

In an example, a user equipment includes: one or more receivers; one or more memories; and one or more processors communicatively coupled to the one or more memories and the receiver, the one or more processors being configured to: obtain first acquisition assistance (AA) data by the one or more receivers from a network; determine whether one or more external coarse position injection (CPI) data, received by the one or more receivers from the network, exceed a reliability threshold; and in response to the one or more external CPI data exceeding the reliability threshold: calculate a horizontal error position estimate (HEPE) based on one or more measurements obtained according to second AA data, where the second AA data includes a subset of satellite vehicles from the first AA data; and determine a position of the user equipment based on the one or more external CPI data and the HEPE.

In another example, a method for determining a position of a user equipment, includes: obtaining first acquisition assistance (AA) data from a network; determining whether one or more external coarse position injection (CPI) data received from the network exceed a reliability threshold; and in response to the one or more external CPI data exceeding the reliability threshold: calculating a horizontal error position estimate (HEPE) based on one or more measurements obtained according to second AA data, where the second AA data includes a subset of satellite vehicles from the first AA data; and determining a position of the user equipment based on the one or more external CPI data and the HEPE.

In another example, a non-transitory, processor-readable storage medium including processor-readable instructions to cause one or more processors to: obtain first acquisition assistance (AA) data from a network; determine whether one or more external coarse position injection (CPI) data received from the network exceed a reliability threshold; and in response to the one or more external CPI data exceeding the reliability threshold: calculate a horizontal error position estimate (HEPE) based on one or more measurements obtained according to second AA data, where the second AA data includes a subset of satellite vehicles from the first AA data; and determine a position of the user equipment based on the one or more external CPI data and the HEPE.

BRIEF DESCRIPTION OF THE DRAWINGS

FIG. 3 illustrates a flow diagram of a method for determining a position of a user equipment after error recovery is triggered.

DETAILED DESCRIPTION

Obtaining the locations of mobile devices that are accessing a wireless network may be useful for many applications including, for example, emergency calls, personal navigation, consumer asset tracking, locating a friend or family member, etc. Existing positioning methods include methods based on measuring signals transmitted from satellite vehicles (SVs) using acquisition assistance data (AA) from a network. For certain applications, such as Enhanced 911 (E911), external coarse position injection (external CPI) data from the network may also be used to assist in determining the position of the user equipment. During a satellite tracking session and while a user equipment (UE) is in an indoor or challenging environment, an error recover may be triggered due to background scan inconsistencies detected in signals transmitted by one or more SVs. After the error recovery is triggered, the AA data for the current positioning determination may be deleted, and the external CPI data may be blocked from being used in determining the position of the UE. External CPI data may not be used again until new external CPI data is injected or until the position of the UE is determined without the external CPI data. The blocking of the external CPI data may cause a delay in the determination of the UE position, which may have a significant negative impact in time sensitive applications such as E911. To reduce the delay, the UE may assess the reliability of the external CPI data. The UE may use the external CPI data in the determination of the UE position when the external CPI data is determined to be reliable. The AA data may be updated by not including the SVs associated with the background scan inconsistencies. The updated AA data may be used in subsequent searches for SVs, which would not include the problematic SVs, thus reducing waste in the use of resources. Other capabilities may be provided and not every implementation according to the disclosure must provide any, let alone all, of the capabilities discussed.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

Figure 1:
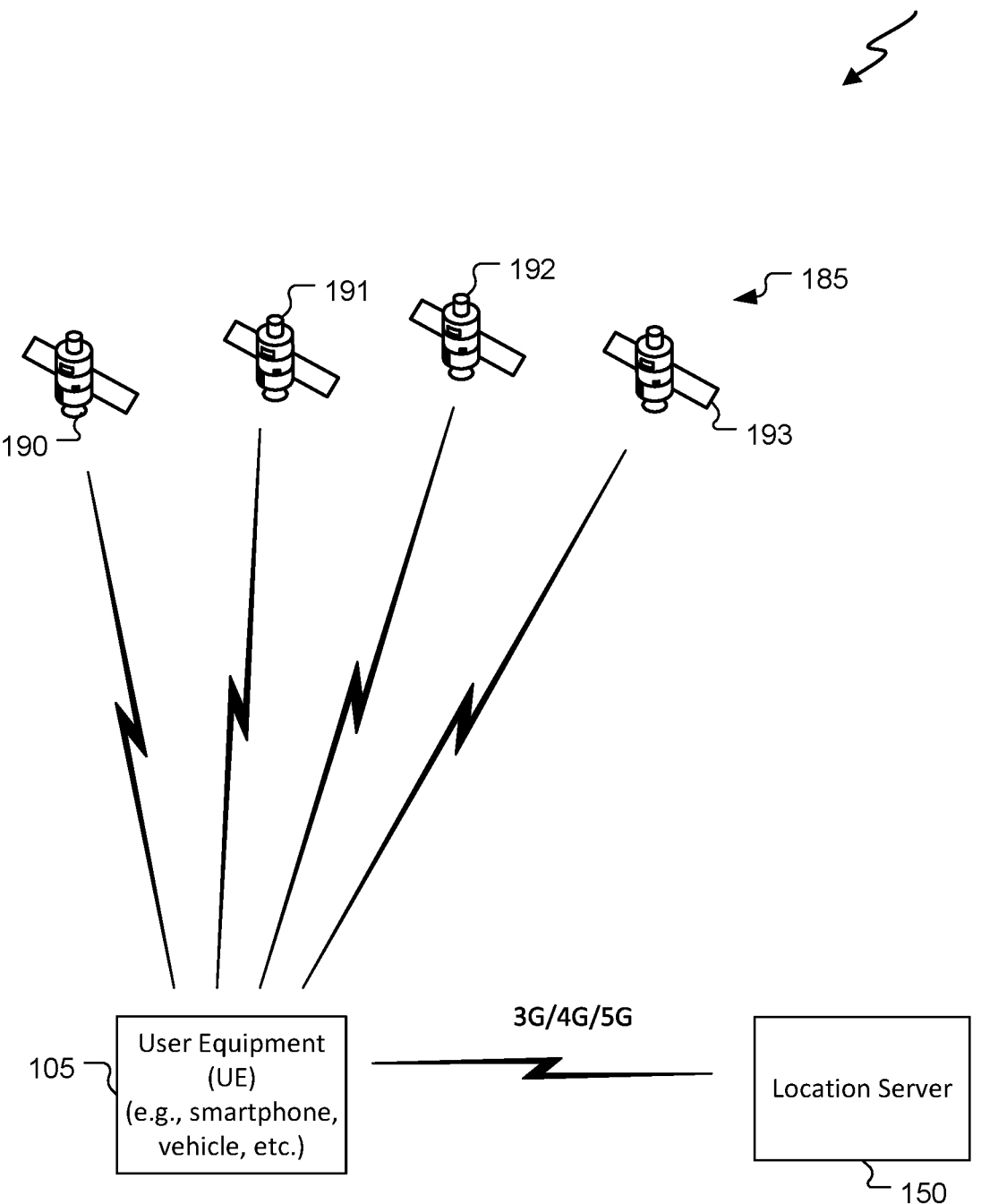
FIG. 1 illustrates a simplified diagram of an example communication system including a user equipment and satellite vehicles.

FIG. 1 illustrates a simplified diagram of an example communication system 100 including a user equipment 105, satellite vehicles (SVs), and a mobile or wireless network (e.g., 3G/4G/5G-based network, Wi-Fi network, or other air interfaces). The user equipment (UE) 105 receives and may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). The communication system 100 may include additional or alternative components. With a UE-based position method, the UE 105 may obtain location measurements from signals received from the SVs 190-193 (e.g., measurements may also or instead include measurements of GNSS pseudorange, code phase, and/or carrier phase for the SVs 190-193) and may compute a location of the UE 105. Acquisition assistance (AA) data, such as measurements from ground-based stations and received through a location server 150, may also be used to compute the location of the UE 105. AA data provides the UE 105 with information that allows the UE 105 to detect the GNSS signals more quickly and allows the detection of weaker signals. Example AA data include time, satellite position, and navigation data. Similar network implementations and configurations may be used for other communication technologies, such as Long Term Evolution (LTE), etc.

As used herein, the term "user equipment" (UE) may be any wireless communication device (e.g., a mobile phone, laptop computer, consumer asset tracking device, etc.) capable of receiving satellite signals. UEs may be embodied by any of a number of types of devices including but not limited to printed circuit (PC) cards, compact flash devices, external or internal modems, wireless or wireline phones, smartphones, tablets, consumer asset tracking devices, asset tags, and so on. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. The UE 105 may be a vehicle-to-everything (V2X) device, such as an On Board Unit (OBU) including a SPS receiver. Other UEs may include wearable devices (e.g., smart watches, smart jewelry, smart glasses, or headsets, etc.). Still other UEs may be used, whether currently existing or developed in the future.

An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Figure 2:
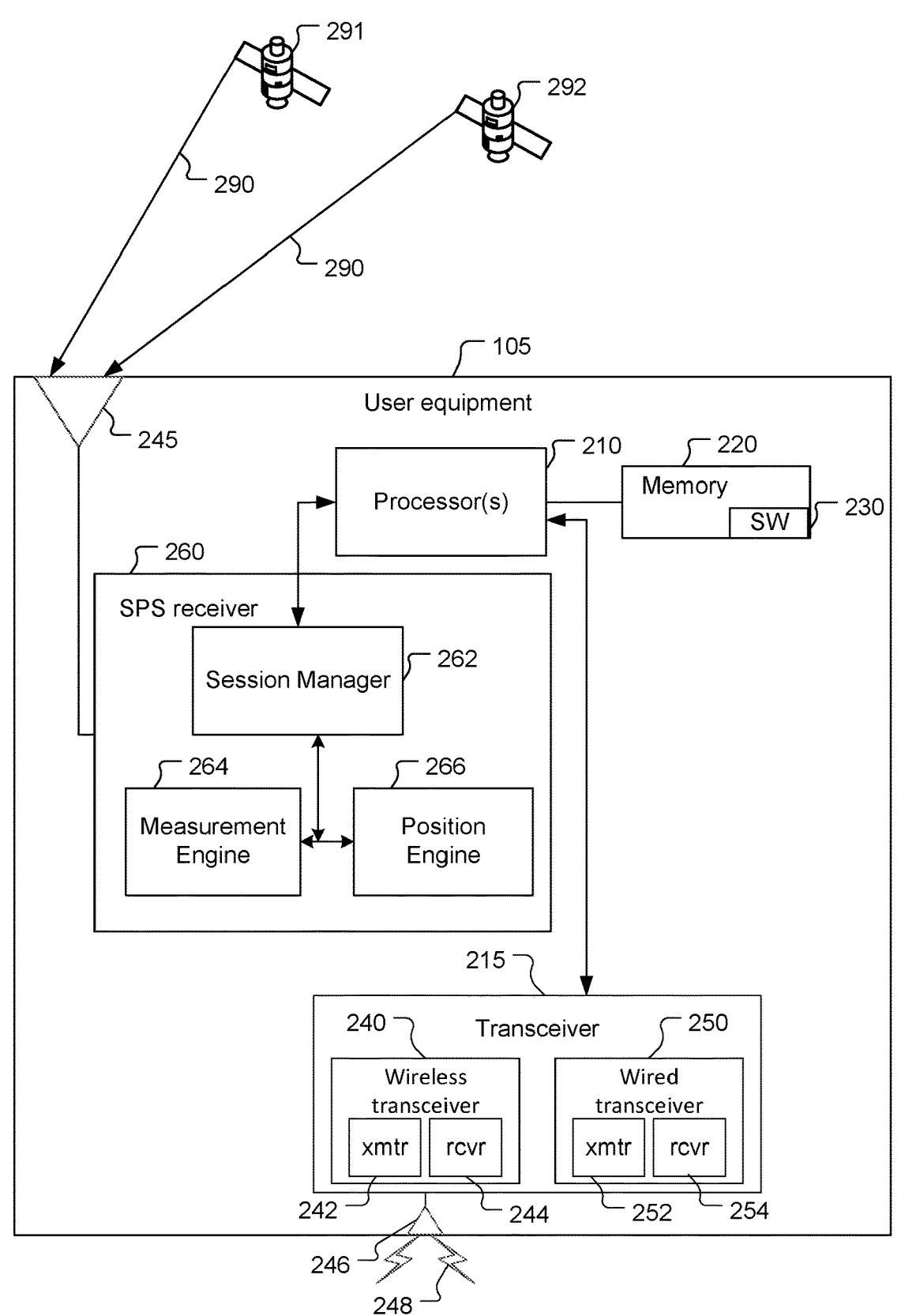
FIG. 2 illustrates an example user equipment.

FIG. 2 illustrates an example UE 105. The UE 105 may comprise a computing platform including one or more processors 210, one or more memories 220 including software (SW) 230, and a Satellite Positioning System (SPS) receiver 240. The one or more processors 210 may comprise multiple processors including a general-purpose/application processor. The one or more memories 220 may be a nontransitory storage medium that may include random access memory (RAM), flash memory, disc memory, and/or read-only memory (ROM), etc. The one or more memories 220 may store the software 230 which may be processor-readable, processor-executable software code containing instructions that may be configured to, when executed, cause the processor 210 to perform various functions described herein. Alternatively, the software 230 may not be directly executable by the one or more processors 210 but may be configured to cause the one or more processors 210, e.g., when compiled and executed, to perform the functions.

The description herein may refer to the one or more processors 210 performing a function, but this includes other implementations such as where the one or more processors 210 executes software and/or firmware. The description herein may refer to the processor(s) 210 performing a function as shorthand for one or more of the processors performing the function. The description herein may refer to the UE 105 performing a function as shorthand for one or more appropriate components of the UE 105 performing the function. The processor(s) 210 may include one or more memories with stored instructions in addition to and/or instead of the one or more memories 220. Functionality of the one or more processors 210 is discussed more fully below.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 250 may include a wired transmitter 252 and a wired receiver 254 configured for wired communication. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The wireless transmitter 242, the wireless receiver 244, and/or the antenna 246 may include multiple transmitters, multiple receivers, and/or multiple antennas, respectively, for sending and/or receiving, respectively, appropriate signals.

The SPS receiver 260 (e.g., a Global Positioning System (GPS) receiver) may be capable of receiving signals 290 from acquired SVs 291, 292 via an SPS antenna 245. The SPS antenna 245 is configured to transduce the signals 290 from wireless signals to wired signals, e.g., electrical, or optical signals. The one or more processors 210, the one or more memories 220, and/or one or more specialized processors (not shown) may be utilized to process signals 290, in whole or in part, and/or to calculate an estimated position of the UE 105, in conjunction with the SPS receiver 260. For example, the SPS receiver 260 may be configured to determine a position of the UE 105 by trilateration using the signals 290. The memory 220 may store indications (e.g., measurements) of the signals 290 and/or other signals for use in performing positioning operations. The processor(s) 210, and/or one or more specialized processors, and/or the memory 220 may provide or support a Session Manager (SM) 262, a Measurement Engine 264, and a Position Engine (PE) 266 of the SPS receiver 260. The SM 262 facilitates communication between an application (possibly implemented by the one or more processors 210, possibly in combination with the one or more memories 220) and the ME 264 and the PE 266, and to perform other functions as described herein. The SM 262, the ME 264, and the PE 266 may be implemented using software, hardware, or a combination of software and hardware.

The SM 262 receives a request from an application (e.g., a map or navigation application; or an E911 application) for a position of the UE 105. The application may be implemented by the one or more processors 210, possibly in combination with the one or more memories 220. The SM 262 sends the request to the ME 264, and the ME 264 initiates a search for SVs. Upon acquiring SVs 291, 292 and receiving signals 290 from the SVs 291, 292, the ME 264 measures the signals 290. The ME 264 sends measurement reports containing the measurements of the signals 290 to the PE 266. The PE 266 determines the position of the UE 105 using the measurements in the measurement reports. The PE 266 sends the position, along with accuracy and reliability information, to the SM 262. The SM 262 further receives AA data from ground-based stations and/or the location server 150 via the transceiver 215. The SM 262 qualifies the position of the UE 105, e.g., uses the position accuracy and position reliability information to determine that the position on the UE 105 meets the requirements of the application. The SM 262 sends the qualified position of the UE 105 to the application. If the SM 262 does not qualify the position of the UE 105, the position is not sent to the application. The measurement of the signals 290 by the ME 264, the determination of the position by the PE 266, and the qualification of the position by the SM 262 continues iteratively. The configuration of the UE 105 shown in FIG. 2 is an example and not limiting of the disclosure, including the claims, and other configurations may be used.

Positioning After Triggering of Error Recovery

During a GNSS tracking session in an indoor or challenging environment, an error recover process may be triggered due to background scan inconsistencies detected in the signals transmitted from the SVs. For example, background scan inconsistencies due to sub-millisecond errors or Doppler errors may be detected on the measurements obtained from the signals transmitted from the SVs. After error recovery is triggered, the measurements for the current position determination and the AA data are deleted. Use of external coarse position injection (external CPI) data from the network may be prevented by the SPS receiver 260. The external CPI data includes location related data from a network external to the SV's 191-192 and used by the SPS receiver 260 to assist in computing the position of the UE 105, such as data obtained from one or more sensors, a Wi-Fi database, etc., received from a 3G/4G/5G network, a Wi-Fi network, or other air interfaces. However, after the triggering of the error recovery, the use of external CPI data is blocked until a different external CPI data is provided by the network or until a final position of the UE 105 is determined without use of the external CPI data. This blocking of the use of the external CPI data occurs even if the external CPI data is reliable, which may result in delays in the determination of the UE position. Such delays may have a significant negative impact in time sensitive applications, such as E911. Further, after the triggering of the error recovery, the search for SVs by the SPS receiver 260 continues to include the problematic SV. Reacquiring the problematic SVs in subsequent searches may waste resources.

To reduce the delay, after the triggering of the error recovery, the UE 105 may assess the reliability of the external CPI data, and use the external CPI data in the determination of the UE position when the external CPI data is determined to be reliable, instead of blocking the use of the external CPI data. The SVs associated with the background scan inconsistencies may also be excluded from the prior AA data, which removes the SVs from subsequent searches and reduces waste in resources.

Referring to FIG. 3, a method for determining a position of a UE 105 after error recovery is triggered includes the stages shown. The method 300 is an example only and not limiting. The method 300 may be altered, e.g., by having one or more stages added, removed, rearranged, combined, performed concurrently, and/or by having one or more single stages split into multiple stages. At stage 310, the method 300 includes obtaining first acquisition assistance (AA) data by one or more receivers from a network. The one or more processors 210, in combination with the one or more memories 220 and the SPS receiver 240, provide means for obtaining the first AA data by the one or more receivers from the network.

At stage 320, the method 300 includes determining whether one or more external CPI data, received by the one or more receivers (e.g., SPS receiver 260) from the network, exceed a reliability threshold. For example, the PE 266 may determine whether an error recovery was triggered due to one or more background scan inconsistencies associated with one or more satellite vehicles (SVs). Background scan inconsistencies may occur due to sub-millisecond errors or Doppler errors detected in the measurements of the signals transmitted from the SVs. If the error recovery was triggered, the PE 266 may determine whether the triggering of the error recovery was due to background scan inconsistencies associated with one or more SVs. The value of the reliability threshold may be determined based on the requirements of the application requesting the position of the UE 105. The PE 266 may determine whether the reliability of the external CPI data exceeds the reliability requirements of the application. The one or more processors 210, in combination with the one or more memories 220 and the SPS receiver 240, provide means for determining whether one or more external CPI data received from a network exceed a reliability threshold.

At stage 330, the method 300 includes, in response to the determination that the one or more external CPI data exceed the reliability threshold, stages 340 and 350 are performed. The one or more processors 210, in combination with the one or more memories 220 and the SPS receiver 240, provide means for performing stages 340 and 350, in response to the determination that the one or more external CPI data exceeding the reliability threshold.

At stage 340, the method 300 includes calculating a horizontal error position estimate (HEPE) based on one or more measurements obtained according to second AA data, where the second AA data includes a subset of satellite vehicles from the first AA data. The HEPE includes a radius of an ellipsoid around an actual location, which is estimated to contain the estimated position of the UE 105 with one sigma of uncertainty. For example, the PE 266 may generate the second AA data to include the subset of SVs, where SVs from the first AA data associated with the background scan inconsistencies are not included in the subset. The subset of satellite vehicles includes fewer satellite vehicles than the first AA. By generate the second AA data to include a subset of the SVs from the first AA data, the PE 266 may prevent the problematic SVs from the first AA data from being included again in subsequent searches for SVs. The PE 266 may send the second AA data to the ME 264. The ME 264 may perform a search on the SVs in the second AA data, may obtain one or more measurements of the signals transmitted from the acquired SVs, and the ME 264 may provide the measurement report to the PE 266. The PE 266 may use the measurements in the measurement report to calculate the HEPE. The one or more processors 210, in combination with the one or more memories 220 and the SPS receiver 240, provide means for calculating a horizontal error position estimate (HEPE) based on one or more measurements obtained according to the second AA data, where the second AA data includes a subset of SVs from the first AA data.

At stage 350, the method 300 includes determining a position of the UE 105 based on the one or more external CPI data and the HEPE. For example, the PE 266 may use the HEPE to determine whether the one or more external CPI data are within the horizontal uncertainty computed based on the measurements of the SVs acquired according to the second AA data. In response to determining that the one or more external CPI data are within the horizontal uncertainty, the PE 266 may determine the position of the UE 105 using at least the one or more external CPI data and the HEPE and may report the position to the SM 262. The one or more processors 210, in combination with the one or more memories 220 and the SPS receiver 240, provide means for determining a position of the UE 105 based on the one or more external CPI data and the HEPE.

Figure 4:
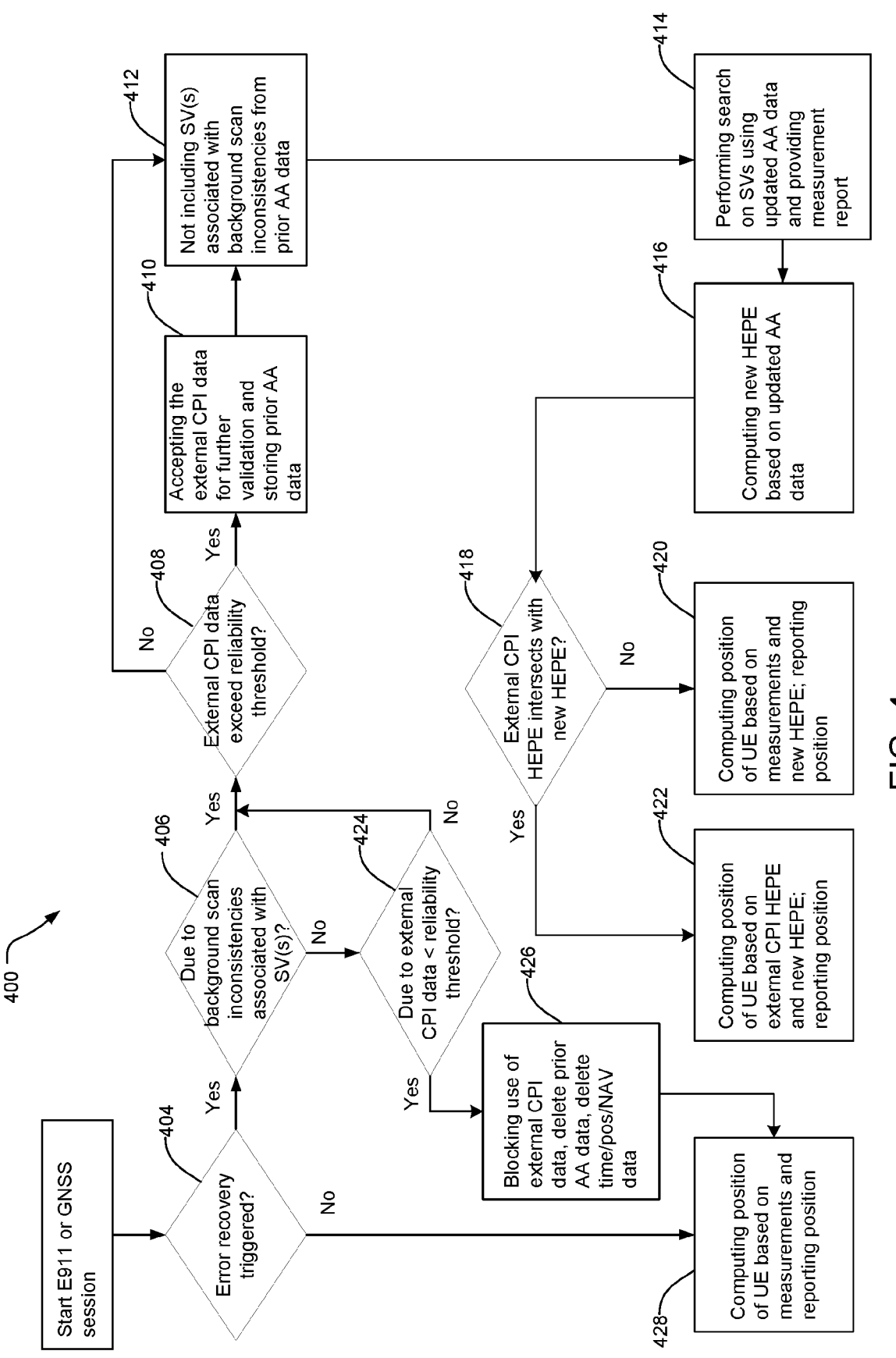
FIG. 4 illustrates a flow diagram of an example implementation of the method for determining a position of a user equipment after error recovery is triggered.

FIG. 4 illustrates a flow diagram of an example implementation of the method for determining a position of a UE after error recovery is triggered. The method 400 is an example only and not limiting. The method 400 may be altered, e.g., by having one or more stages added, removed, rearranged, combined, performed concurrently, and/or by having one or more single stages split into multiple stages.

At stage 404, after the start of an E911 or a GNSS session, the method 400 includes determining whether an error recovery was triggered. For example, the PE 266 may periodically check for the triggering of an error recovery. The one or more processors 210, in combination with the one or more memories 220 and the SPS receiver 240, provide means for determining whether an error recovery process was triggered.

At stage 406, the method 400 includes, if an error recovery was triggered, then determining whether the error recovery was due to background scan inconsistencies associated with one or more SVs. For example, using information in the measurement report from the ME 264, the PE 266 may determine whether the error recovery was due to background scan inconsistencies detected in signals transmitted from the one or more SVs. The one or more processors 210, in combination with the one or more memories 220 and the SPS receiver 240, provide means for, if an error recovery was triggered, then determining whether the error recovery was due to background scan inconsistencies associated with one or more SVs.

At stage 408, the method 400 includes, if the error recovery process was due to background scan inconsistencies associated with the one or more SVs, then determining whether the external CPI data exceed a reliability threshold. For example, the SM 262 may receive the external CPI data that include reliability information from an application. The PE 266 may receive the external CPI data from the SM 262. The PE 266 may use the reliability information in the external CPI data to determine whether the external CPI data exceed a reliability threshold. The value of the reliability threshold may be determined based on the requirements of the application requesting the position of the UE 105. The one or more processors 210, in combination with the one or more memories 220 and the SPS receiver 240, provide means for, if the error recovery was due to background scan inconsistencies associated with the one or more SVs, then determining whether the external CPI data exceed a reliability threshold.

At stage 410, the method 400 includes, if the external CPI data exceed the reliability threshold, then accepting the external CPI data for further validation and storing the prior AA data. For example, if the PE 266 determines that the reliability information in the external CPI data exceed the reliability threshold, the PE 266 may accept the external CPI data as reliable data, i.e., may be reliable for use in the determination of the UE position after further validation. An example of the validation of the external CPI data is described further below with reference to stage 418. The PE 266 may store the prior AA data to create a backup of the prior AA data. The one or more processors 210, in combination with the one or more memories 220 and the SPS receiver 240, provide means for, if the external CPI data exceed the reliability threshold, then accepting the external CPI data for further validation and storing the prior AA data. The method 400 does not include performance of stage 410 if the external CPI data does not exceed the reliability threshold.

At stage 412, the method 400 includes not including the SV(s) associated with the background scan inconsistencies from the prior AA data. For example, the PE 266 may update the prior AA data by deleting, marking as inactive, or otherwise indicating that the SV(s) associated with the background scan inconsistencies are not to be included in subsequent searches. The one or more processors 210, in combination with the one or more memories 220 and the SPS receiver 240, provide means for not including the SV(s) associated with the background scan inconsistencies from the prior AA data.

At stage 414, the method 400 includes performing a search on the SVs using the updated AA data and providing a measurement report. For example, the PE 266 may send the updated AA data to the ME 264. The ME 264 may search for available SVs using the updated AA data that does not include the SVs associated with the background scan inconsistencies, thus may avoid reacquiring the problematic SVs. Once the SVs are acquired, the ME 264 may obtain measurements from the signals transmitted by the acquired SVs and may send a measurement report to the PE 266. The one or more processors 210, in combination with the one or more memories 220 and the SPS receiver 240, provide means for performing a search on the SVs using the updated AA data and providing a measurement report.

At stage 416, the method 400 includes computing a new HEPE based on the updated AA data. For example, the PE 266 may compute a new HEPE based on the measurements obtained from the SVs acquired using the updated AA data. The one or more processors 210, in combination with the one or more memories 220 and the SPS receiver 240, provide means for computing a new HEPE based on the updated AA data.

At stage 418, the method 400 includes further validating the external CPI data by determining whether an external CPI HEPE intersects the new HEPE. For example, the PE 266 may calculate an external CPI HEPE for the external CPI data and may determine whether the external CPI HEPE intersects the new HEPE. If the external CPI HEPE and the new HEPE intersect, then the external CPI data may be validated. Otherwise, the external CPI data may not be validated. The intersection of the external CPI HEPE and the new HEPE may indicate that the external CPI data may be within the horizontal error position estimate calculated based on the measurements and thus reliable. The one or more processors 210, in combination with the one or more memories 220 and the SPS receiver 240, provide means for further validating the external CPI data by determining whether an external CPI HEPE intersects the new HEPE.

At stage 420, the method 400 includes, if the external CPI HEPE does not intersect with the new HEPE, then computing a position of the UE 105 based on the measurements and the new HEPE and reporting the position. For example, the PE 266 may compute the position of the UE 105 based on the new HEPE and the measurements, obtained in stage 414, that were generated based on the updated AA data. The PE 266 may report the position to the SM 262, along with related accuracy and reliability information. If the external CPI data was not validated at stage 418, then the external CPI data are not considered in computing the position. The one or more processors 210, in combination with the one or more memories 220 and the SPS receiver 240, provide means for, if the external CPI HEPE does not intersect with the new HEPE, then computing a position of the UE 105 based on the measurements and the new HEPE and reporting the position.

At stage 422, the method 400 includes, if the external CPI HEPE intersects with the new HEPE, then computing the position of the UE 105 based on the external CPI HEPE and the new HEPE and reporting the position. For example, if the external CPI data are validated at stage 418, then the PE 266 computes the position of the UE 105 based on the intersection of the external CPI HEPE and the new HEPE. The PE 266 may report the position to the SM 262, along with related accuracy and reliability information. The one or more processors 210, in combination with the one or more memories 220 and the SPS receiver 240, provide means for, if the external CPI HEPE intersects with the new HEPE, then computing the position of the UE 105 based on the external CPI HEPE and the new HEPE and reporting the position.

At stage 424, the method 400 includes, if the error recovery was not due to background scan inconsistencies associated with the SV(s) (determined at stage 406), then determining whether the error recovery was due to the external CPI being below the reliability threshold. For example, the PE 266 may determine whether the external CPI data fail to exceed the reliability threshold, set according to the requirements of the application requesting the position of the UE 105. The one or more processors 210, in combination with the one or more memories 220 and the SPS receiver 240, provide means for, if the error recovery was not due to background scan inconsistencies associated with the SV(s), then determining whether the error recovery was due to the external CPI being below the reliability threshold.

At stage 426, the method 400 includes, if the external CPI data fail to exceed the reliability threshold, then blocking use of the external CPI data in computing the position of the UE 105 and deleting the prior AA data. For example, if the PE 266 determines that the external CPI data fails to exceed the reliability threshold, then the PE 266 blocks the use of the external CPI data and deletes the AA data for the current position determination. The one or more processors 210, in combination with the one or more memories 220 and the SPS receiver 240, provide means for, if the external CPI data fail to exceed the reliability threshold, then blocking use of external CPI data in computing the position of the UE 105 and deleting the prior AA data.

At stage 428, the method 400 includes, if the error recovery was not triggered, then computing the position of the UE 105 based on the measurements obtained from the acquired SVs and reporting the position. For example, unless an error recovery was triggered, the PE 266 computes the position of the UE 105 based on the measurements and reports the position to the SM 262. The one or more processors 210, in combination with the one or more memories 220 and the SPS receiver 240, provide means for, if the error recovery was not triggered, then computing the position of the UE 105 based on the measurements obtained from the acquired SVs and reporting the position.

IMPLEMENTATION EXAMPLES

Implementation examples are provided in the following numbered clauses.

Clause 1. A user equipment, comprising: one or more receivers; one or more memories; and one or more processors communicatively coupled to the one or more memories and the one or more receivers, the one or more processors being configured to: obtain first acquisition assistance (AA) data by the one or more receivers from a network; determine whether one or more external coarse position injection (CPI) data, received by the one or more receivers from the network, exceed a reliability threshold; and in response to the one or more external CPI data exceeding the reliability threshold: calculate a horizontal error position estimate (HEPE) based on one or more measurements obtained according to second AA data, wherein the second AA data includes a subset of satellite vehicles from the first AA data; and determine a position of the user equipment based on the one or more external CPI data and the HEPE.

Clause 2. The user equipment of Clause 1, wherein the subset of the satellite vehicles includes fewer satellite vehicles than the first AA data.

Clause 3. The user equipment of Clause 1, wherein the one or more processors configured to determine whether the one or more external CPI data are validated based on the HEPE are further configured to: compute an external CPI HEPE based on the one or more external CPI data; compute a new HEPE based on the one or more measurements obtained according to the second AA data; determine whether the external CPI HEPE and the new HEPE overlap; and in response to determining that the external CPI HEPE and the new HEPE overlap, determine that the one or more external CPI data are validated.

Clause 4. The user equipment of Clause 3, wherein the one or more processors are further configured to: compute the position of the user equipment using the external CPI HEPE and the new HEPE based on the one or more external CPI data being validated.

Clause 5. The user equipment of Clause 3, wherein the one or more processors are further configured to: compute the position of the user equipment using the second AA data and the new HEPE based on the one or more external CPI data not being validated.

Clause 6. The user equipment of Clause 1, wherein the one or more processors are further configured to: determine whether an error recovery was due to one or more background scan inconsistencies associated with the one or more satellite vehicles; and determine whether the one or more external CPI data exceed the reliability threshold based on the error recovery being due to the one or more background scan inconsistencies.

Clause 7. The user equipment of Clause 6, wherein the one or more processors are further configured to: determine whether the one or more external CPI data received from the network exceed the reliability threshold based on the error recovery not being due to the one or more background scan inconsistencies; and exclude use of the one or more external CPI data in a determination of the position of the user equipment based on the one or more external CPI data not exceeding the reliability threshold.

Clause 8. A method for determining a position of a user equipment, comprising: obtaining first acquisition assistance (AA) data from a network; determining whether one or more external coarse position injection (CPI) data received from the network exceed a reliability threshold; and in response to the one or more external CPI data exceeding the reliability threshold: calculating a horizontal error position estimate (HEPE) based on one or more measurements obtained according to second AA data, wherein the second AA data includes a subset of satellite vehicles from the first AA data; and determining a position of the user equipment based on the one or more external CPI data and the HEPE.

Clause 9. The method of Clause 8, wherein the subset of the satellite vehicles includes fewer satellite vehicles than the first AA data.

Clause 10. The method of Clause 8, wherein the determining of whether the one or more external CPI data are validated based on the HEPE comprises: computing an external CPI HEPE based on the one or more external CPI data; computing a new HEPE based on the one or more measurements obtained according to the second AA data; determining whether the external CPI HEPE and the new HEPE overlap; and in response to determining that the external CPI HEPE and the new HEPE overlap, determining that the one or more external CPI data are validated.

Clause 11. The method of Clause 10, further comprising: computing the position of the user equipment using the external CPI HEPE and the new HEPE based on the one or more external CPI data being validated.

Clause 12. The method of Clause 10, further comprising: computing the position of the user equipment using the second AA data and the new HEPE based on the one or more external CPI data not being validated.

Clause 13. The method of Clause 8, further comprising: determining whether an error recovery was due to one or more background scan inconsistencies associated with the one or more satellite vehicles; and determining whether the one or more external CPI data exceed the reliability threshold based on the error recovery being due to the one or more background scan inconsistencies.

Clause 14. The method of Clause 13, further comprising: determining whether the one or more external CPI data received from the network exceed the reliability threshold based on the error recovery not being due to the one or more background scan inconsistencies; and excluding use of the one or more external CPI data in a determination of the position of the user equipment based on the one or more external CPI data not exceeding the reliability threshold.

Clause 15. A non-transitory, processor-readable storage medium comprising processor-readable instructions to cause one or more processors to: obtain first acquisition assistance (AA) data from a network; determine whether one or more external coarse position injection (CPI) data received from the network exceed a reliability threshold; and in response to the one or more external CPI data exceeding the reliability threshold: calculate a horizontal error position estimate (HEPE) based on one or more measurements obtained according to second AA data, wherein the second AA data includes a subset of satellite vehicles from the first AA data; and determine a position of the user equipment based on the one or more external CPI data and the HEPE.

Clause 16. The medium of Clause 15, wherein the subset of the satellite vehicles includes fewer satellite vehicles than the first AA data.

Clause 17. The medium of Clause 15, wherein the one or more processors configured to determine whether the one or more external CPI data are validated based on the HEPE are further configured to: compute an external CPI HEPE based on the one or more external CPI data; compute a new HEPE based on the one or more measurements obtained according to the second AA data; determine whether the external CPI HEPE and the new HEPE overlap; and in response to determining that the external CPI HEPE and the new HEPE overlap, determine that the one or more external CPI data are validated.

Clause 18. The medium of Clause 17, wherein the one or more processors are further configured to: compute the position of the user equipment using the external CPI HEPE and the new HEPE based on the one or more external CPI data being validated.

Clause 19. The medium user equipment of claim 17, wherein the one or more processors are further configured to: compute the position of the user equipment using the second AA data and the new HEPE based on the one or more external CPI data not being validated.

Clause 20. The medium of Clause 15, wherein the one or more processors are further configured to: determine whether an error recovery was due to one or more background scan inconsistencies associated with the one or more satellite vehicles; and determine whether the one or more external CPI data exceed the reliability threshold based on the error recovery being due to the one or more background scan inconsistencies.

Clause 21. The medium of Clause 20, wherein the one or more processors are further configured to: determine whether the one or more external CPI data received from the network exceed the reliability threshold based on the error recovery not being due to the one or more background scan inconsistencies; and exclude use of the one or more external CPI data in a determination of the position of the user equipment based on the one or more external CPI data not exceeding the reliability threshold.

Clause 22. A computing device, comprising: means for determining whether one or more external coarse position injection (CPI) data received from a network exceed a reliability threshold; and means for, in response to the one or more external CPI data exceeding the reliability threshold: means for calculating a horizontal error position estimate (HEPE) based on one or more measurements obtained according to updated AA data, wherein the updated AA data excludes one or more satellite vehicles from prior AA data received from the network; and means for determining a position of the user equipment using the one or more external CPI data and the HEPE.

Clause 23. The device of Clause 22, wherein the subset of the satellite vehicles includes fewer satellite vehicles than the first AA data.

Clause 24. The device of Clause 22, wherein the determining of whether the one or more external CPI data are validated based on the HEPE comprises: means for computing an external CPI HEPE based on the one or more external CPI data; means for computing a new HEPE based on the one or more measurements obtained according to the second AA data; means for determining whether the external CPI HEPE and the new HEPE overlap; and means for, in response to determining that the external CPI HEPE and the new HEPE overlap, determining that the one or more external CPI data are validated.

Clause 25. The device of Clause 24, further comprising: means for computing the position of the user equipment using the external CPI HEPE and the new HEPE based on the one or more external CPI data being validated.

Clause 26. The device of Clause 24, further comprising: means for computing the position of the user equipment using the second AA data and the new HEPE based on the one or more external CPI data not being validated.

Clause 27. The device of Clause 22, further comprising: means for determining whether an error recovery was due to one or more background scan inconsistencies associated with the one or more satellite vehicles; and means for determining whether the one or more external CPI data exceed the reliability threshold based on the error recovery being due to the one or more background scan inconsistencies.

Clause 28. The device of Clause 27, further comprising: means for determining whether the one or more external CPI data received from the network exceed the reliability threshold based on the error recovery not being due to the one or more background scan inconsistencies; and means for excluding use of the one or more external CPI data in a determination of the position of the user equipment based on the one or more external CPI data not exceeding the reliability threshold.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment, comprising:
one or more receivers;
one or more memories; and
one or more processors communicatively coupled to the one or more memories and the one or more receivers, the one or more processors being configured to:
obtain first acquisition assistance (AA) data by the one or more receivers from a network;
determine whether one or more external coarse position injection (CPI) data, received by the one or more receivers from the network, exceed a reliability threshold; and
in response to the one or more external CPI data exceeding the reliability threshold:
calculate a horizontal error position estimate (HEPE) based on one or more measurements obtained according to second AA data, wherein the second AA data includes a subset of satellite vehicles from the first AA data; and
determine a position of the user equipment based on the one or more external CPI data and the HEPE.

2. The user equipment of claim 1, wherein the subset of the satellite vehicles includes fewer satellite vehicles than the first AA data.

3. The user equipment of claim 1, wherein the one or more processors configured to determine whether the one or more external CPI data are validated based on the HEPE are further configured to:

compute an external CPI HEPE based on the one or more external CPI data;

compute a new HEPE based on the one or more measurements obtained according to the second AA data;

determine whether the external CPI HEPE and the new HEPE overlap; and in response to determining that the external CPI HEPE and the new HEPE overlap, determine that the one or more external CPI data are validated.

4. The user equipment of claim 3, wherein the one or more processors are further configured to:

compute the position of the user equipment using the external CPI HEPE and the new HEPE based on the one or more external CPI data being validated.

5. The user equipment of claim 3, wherein the one or more processors are further configured to:

compute the position of the user equipment using the second AA data and the new HEPE based on the one or more external CPI data not being validated.

6. The user equipment of claim 1, wherein the one or more processors are further configured to:

determine whether an error recovery was due to one or more background scan inconsistencies associated with the one or more satellite vehicles; and determine whether the one or more external CPI data exceed the reliability threshold based on the error recovery being due to the one or more background scan inconsistencies.

7. The user equipment of claim 6, wherein the one or more processors are further configured to:

determine whether the one or more external CPI data received from the network exceed the reliability threshold based on the error recovery not being due to the one or more background scan inconsistencies; and exclude use of the one or more external CPI data in a determination of the position of the user equipment based on the one or more external CPI data not exceeding the reliability threshold.

8. A method for determining a position of a user equipment, comprising:

obtaining first acquisition assistance (AA) data from a network;

determining whether one or more external coarse position injection (CPI) data received from the network exceed a reliability threshold; and in response to the one or more external CPI data exceeding the reliability threshold:

calculating a horizontal error position estimate (HEPE) based on one or more measurements obtained according to second AA data, wherein the second AA data includes a subset of satellite vehicles from the first AA data; and determining a position of the user equipment based on the one or more external CPI data and the HEPE.

9. The method of claim 8, wherein the subset of the satellite vehicles includes fewer satellite vehicles than first AA data.

10. The method of claim 8, wherein the determining of whether the one or more external CPI data are validated based on the HEPE comprises:

computing an external CPI HEPE based on the one or more external CPI data;

computing a new HEPE based on the one or more measurements obtained according to the second AA data;

determining whether the external CPI HEPE and the new HEPE overlap; and in response to determining that the external CPI HEPE and the new HEPE overlap, determining that the one or more external CPI data are validated.

11. The method of claim 10, further comprising:

computing the position of the user equipment using the external CPI HEPE and the new HEPE based on the one or more external CPI data being validated.

12. The method of claim 10, further comprising:

computing the position of the user equipment using the second AA data and the new HEPE based on the one or more external CPI data not being validated.

13. The method of claim 8, further comprising:

determining whether an error recovery was due to one or more background scan inconsistencies associated with the one or more satellite vehicles; and determining whether the one or more external CPI data exceed the reliability threshold based on the error recovery being due to the one or more background scan inconsistencies.

14. The method of claim 13, further comprising:

determining whether the one or more external CPI data received from the network exceed the reliability threshold based on the error recovery not being due to the one or more background scan inconsistencies; and excluding use of the one or more external CPI data in a determination of the position of the user equipment based on the one or more external CPI data not exceeding the reliability threshold.

15. A non-transitory, processor-readable storage medium comprising processor-readable instructions to cause one or more processors to:

obtain first acquisition assistance (AA) data from a network;

determine whether one or more external coarse position injection (CPI) data received from the network exceed a reliability threshold; and in response to the one or more external CPI data exceeding the reliability threshold:

calculate a horizontal error position estimate (HEPE) based on one or more measurements obtained according to second AA data, wherein the second AA data includes a subset of satellite vehicles from the first AA data; and determine a position of the user equipment based on the one or more external CPI data and the HEPE.

16. The medium of claim 15, wherein the subset of the satellite vehicles includes fewer satellite vehicles than the first AA data.

17. The medium of claim 15, wherein the one or more processors configured to determine whether the one or more external CPI data are validated based on the HEPE are further configured to:

compute an external CPI HEPE based on the one or more external CPI data;

compute a new HEPE based on the one or more measurements obtained according to the second AA data;

determine whether the external CPI HEPE and the new HEPE overlap; and in response to determining that the external CPI HEPE and the new HEPE overlap, determine that the one or more external CPI data are validated.

18. The medium of claim 17, wherein the one or more processors are further configured to:

compute the position of the user equipment using the external CPI HEPE and the new HEPE based on the one or more external CPI data being validated.

19. The medium user equipment of claim 17, wherein the one or more processors are further configured to:

compute the position of the user equipment using the second AA data and the new HEPE based on the one or more external CPI data not being validated.

20. The medium of claim 15, wherein the one or more processors are further configured to:

determine whether an error recovery was due to one or more background scan inconsistencies associated with the one or more satellite vehicles; and determine whether the one or more external CPI data exceed the reliability threshold based on the error recovery being due to the one or more background scan inconsistencies.

* * * * *